(12) United States Patent
Garg et al.

(10) Patent No.: US 9,097,547 B2
(45) Date of Patent: Aug. 4, 2015

(54) SYSTEM AND METHOD FOR VEHICLE ROUTING USING MONETARY COST

(71) Applicant: 8318808 Canada Inc., Toronto (CA)

(72) Inventors: Neeraj Garg, Milton (CA); Anil Bhole, Toronto (CA)

(*) Notice: Subject to any disclaimer, the term of this patent is extended or adjusted under 35 U.S.C. 154(b) by 54 days.

(21) Appl. No.: 13/834,505

(22) Filed: Mar. 15, 2013

(65) Prior Publication Data

US 2014/0278092 A1    Sep. 18, 2014

(51) Int. Cl.
*G01C 21/00* (2006.01)
*G01C 21/34* (2006.01)
*G06Q 10/06* (2012.01)
*G01C 21/20* (2006.01)

(52) U.S. Cl.
CPC ...... *G01C 21/3484* (2013.01); *G06Q 10/06315* (2013.01); *G01C 21/20* (2013.01); *G01C 21/3446* (2013.01); *G01C 21/3461* (2013.01)

(58) Field of Classification Search
CPC .... G01C 21/3446; G01C 21/32; G01C 21/20; G01C 21/3461
USPC .................. 701/410, 468, 532, 533
See application file for complete search history.

(56) References Cited

U.S. PATENT DOCUMENTS

| | | | |
|---|---|---|---|
| 2006/0241854 A1* | 10/2006 | Tu et al. ......................... | 701/202 |
| 2008/0154489 A1* | 6/2008 | Kaneda et al. ................. | 701/201 |
| 2010/0262359 A1* | 10/2010 | Motoyama ..................... | 701/200 |
| 2011/0238457 A1* | 9/2011 | Mason et al. .................. | 705/7.14 |
| 2014/0005942 A1* | 1/2014 | Nogawa et al. ................ | 701/533 |

* cited by examiner

*Primary Examiner* — Gertrude Arthur Jeanglaude
(74) *Attorney, Agent, or Firm* — Bhole IP Law; Anil Bhole

(57) ABSTRACT

A vehicle routing system and method in which routing is based in part on the monetary cost of various candidate routes. The candidate route that has a monetary cost less than a user determined cost parameter is selected as the route to be presented to the user.

14 Claims, 2 Drawing Sheets

SYSTEM AND METHOD FOR VEHICLE ROUTING USING MONETARY COST

TECHNICAL FIELD

The following relates generally to vehicle routing and more specifically to minimizing the cost of routing a vehicle based on a user defined cost parameter.

BACKGROUND

There have been many routing systems on the market over the last decade or more. Many such systems are provided in standalone devices for use in automobiles or other road-going vehicles. Other systems are now being made available on smartphones but are usually made to replicate the standalone device experience.

Typically, these systems determine a candidate route between two points in accordance with particular user configured parameters, including fastest time to travel, shortest distance, whether to use toll routes, and based on traffic conditions.

It is an object of the following to obviate or mitigate at least one of the foregoing disadvantages.

SUMMARY

In one aspect, a vehicle routing system is provided, the system comprising: (a) a user interface operable to collect from a user: (i) a start point and end point for which a route is requested; and; (ii) a cost parameter for said user; (b) a routing database comprising toll information for routes in a territory; and (c) a routing engine operable to determine one or more candidate routes between the start point and the end point and select the route from among the candidate routes by determining which of said candidate routes has a monetary cost lower than said cost parameter.

In another aspect, a method for vehicle routing is provided, the method comprising: (a) collecting from a user: (i) a start point and end point for which a route is requested; and (ii) a cost parameter for said user; (b) determining, from a routing database comprising toll information for routes in a territory, one or more candidate routes between the start point and the end point; and (c) selecting, by one or more processors, the route from among the candidate routes by determining which of said candidate routes has a monetary cost lower than said cost parameter.

BRIEF DESCRIPTION OF THE DRAWINGS

The features of the invention will become more apparent in the following detailed description in which reference is made to the appended drawings wherein.

DETAILED DESCRIPTION

Figure 1:
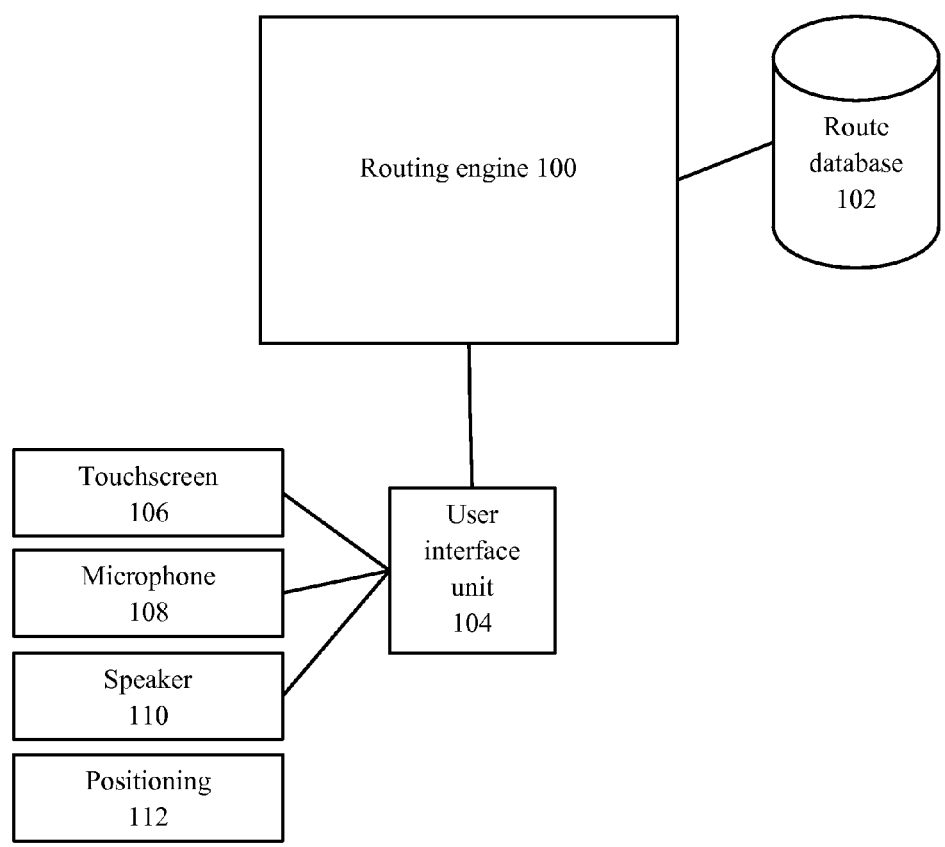
FIG. 1 is an architecture diagram of a vehicle routing system.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

The following provides a vehicle routing system operable to provide a vehicle routing method. The vehicle routing system enables a user to configure at least one cost parameter. In an embodiment, the cost parameter relates to the monetary value of the user's time. The system factors the cost parameter into the routing problem for which a solution is presented to the user.

Referring now to FIG. 1, a routing engine 100 is linked to a route database 102 for a specified territory. Various route databases are known in the art and generally comprise a matrix representation of route information, including roads, highways, lanes, etc. (collectively, "roads") and the distances between them, speed limits, obstructions (e.g., traffic lights, stop signs, etc.) and other information (e.g., traffic conditions, road construction, etc.). The route database 102 generally provides information sufficient to determine a route between two points and a reasonable estimation of the time required to travel such route. A route database 102 in accordance with various embodiments further comprises toll information for the roads; that is, the toll fare for any toll roads among the roads are listed in the route database. Tolls may comprise not only typical road tolls but also costs for travelling on a ferry or other vessel. Tolls may further vary based on time of day.

The routing engine 100 is operable to solve a routing problem between at least two points being a start point and an end point for which a solution can be found using the route database. That is, the start point and end point are within the territory described in the route database 102. Optionally, the routing engine 100 is operable to solve the routing problem given one or more intermediate points, representing "stops" the user wishes to make between the start point and the end point, which will be traversed along the route. It will be understood that such functionality may be implemented by treating each point-to-point interval as a routing segment and solving each routing segment individually. In the following description, the routing problem is described as having a start point and end point, but given the above it will be appreciated that the following extends to the use of intermediate points.

The routing engine 100 is linked to a user interface unit 104 operable to collect user input from a user. The user interface unit 104 may comprise, for example, a touchscreen interface 106 operable to provide a visual output to the user and collect from the user an input. The input may be collected, for example, from a virtual keypad displayed on the touchscreen interface 106. Additionally, or alternatively, the user interface unit may comprise a microphone 108 and, optionally, a speaker 110 to collect user input via a voice command. The user input generally comprises address information to describe the start point and end point. Optionally, the start point can be taken as the current location, which may be determined by a positioning unit 112, which may implement a positioning technique such as GPS for example. Optionally, the user input can be used to navigate a menu system listing known or previously located points.

It will be appreciated that collecting user input via a virtual keypad and via voice command are known in the art and will be readily understood by a person skilled in the art.

Figure 2:
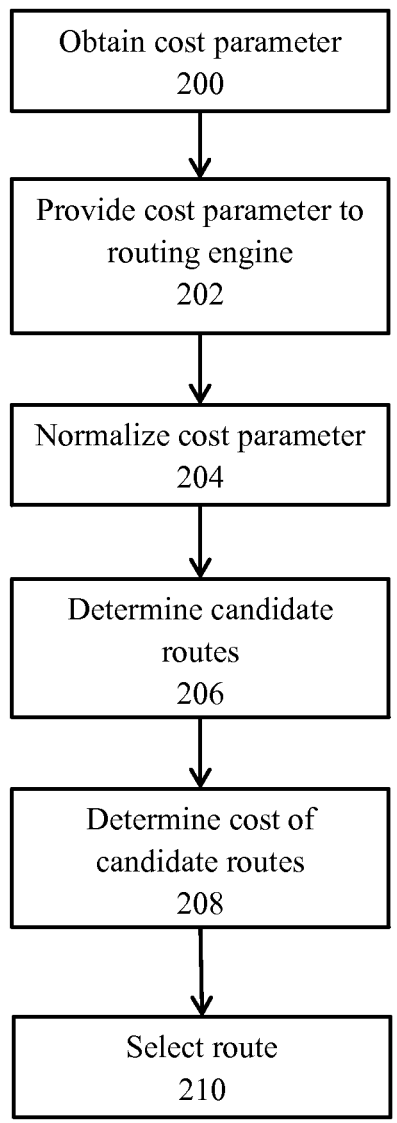
FIG. 2 is a flowchart depicting a vehicle routing method.

Referring now to FIG. 2, in an embodiment, at block 200 at least one cost parameter is obtained from the user using input mechanism utilized by the user interface. The cost parameter may relate to the monetary value of the user's time, which is left to the user's determination. In examples, a particular user may value their time very little, as in $0/hour, whereas another user may value their time very highly, as in $500/hour, for example, noting that any value could be provided. The user may provide the monetary value of the user's time as any currency amount per any unit of time.

It will be appreciated that a user may value their time differently in different circumstances, for example leisure vs. business time, casual drive vs. urgent drive (e.g., baby crying in the car may be considered urgent). In embodiments, the system is configurable to store costs specified by a user and categorize the costs based on preconfigured categories, including, for example, leisure, business, family, urgent, casual, etc. In further embodiments, the user can configure the system to select one of the configured costs based on time of day, day of week, etc.

The cost parameter may, alternatively, be a preconfigured value or values stored in the user interface unit or routing engine.

The user interface may enable the user to provide the cost parameter using a user-specified unit, and in block 202 provides the cost parameter to the routing engine, which in block 204 normalizes the cost parameter to a normalized unit. For example, if the user entered the cost parameter in Euros per minute, the routing engine may normalize the cost parameter to dollars per hour using a transformation formula. Any suitable normalized unit may be used, though typically the normalized unit currency will depend on the jurisdiction in which routing is taking place (as that would most likely be the currency of tolls), and the normalized unit time will likely be in minutes or hours.

In block 206, the routing engine is operable to determine a plurality of candidate routes from the start point to the end point in accordance with varying at least one routing parameter. In one embodiment, the routing parameter comprises whether or not to traverse toll roads. In other words, the routing engine is operable to determine the candidate route that comprises no toll roads, and any number of candidate routes that comprise toll roads. There may be more than one such candidate route in the instance that a toll road, a portion of a toll road, or a plurality of toll roads could comprise a part or all of the route. For example, the routing engine may determine that a route between start point A and end point B can be traversed in an estimated 15 minutes using a route of roads M, N and O where none are toll roads; in an estimated 12 minutes using a route of road M, P and O, where P is a toll road; or in an estimated 10 minutes using a route of M, P, Q and O where P and Q are toll roads. Typically, if all routes comprising at least one toll road would require more time to traverse than at least one route not having any toll roads, then the sole candidate route would be the route having no toll roads.

In block 208, the routing engine determines a monetary cost of each candidate route. In an embodiment, routes having no toll roads will have no monetary cost while those having toll roads will have a monetary cost based upon the cost of the respective tolls.

Given the cost of each candidate route, and the estimated time savings (that is, the travel time difference between the candidate route and another candidate route), the routing engine determines the monetary cost of taking such route (relative to the no-cost route). For example, if the route M-N-O has a monetary cost of zero and is estimated to require 15 minutes of travel time; the route M-P-O has a monetary cost of 3 dollars and is estimated to require 12 minutes of travel time; and the route M-P-Q-O has a monetary cost of 15 dollars and is estimated to require 10 minutes of travel time; then the monetary costs of the routes are as follows: selecting M-N-O has a monetary cost of zero; selecting M-P-O has a monetary cost of 3 dollars to save 3 minutes (15 minus 12) or $60/hour; and selecting M-P-Q-O has a monetary cost of 15 dollars to save 5 minutes (15 minus 10) or $180/hour.

In block 210, the routing engine selects as the route to present to the user, the candidate route having the least travel time but also having a monetary cost that is lower than the user-specified monetary value of time. Thus, provided that the user specified a monetary value of time of $100 per hour, in the foregoing example the routing engine will select the route M-P-O, as its monetary cost is lower than the user specified cost parameter.

In embodiments, the user may specify an absolute monetary cost that may be incurred in candidate route selection. For example, the user may be willing to incur an absolute monetary cost of $10 to travel from the start point to the end point. The routing engine subsequently selects as the candidate route to present to the user, the route having the least travel time but also having a total toll cost (without reference to time savings) lower than the absolute monetary cost specified by the user.

In embodiments, a plurality of users may provide the user interface with their respective monetary values of time. The routing engine may normalize the values and provide a blended value with which to determine the selected candidate route. The blended value may be determined by: the lowest or highest of the values, the average of the values, the median of the values, an average of a subset of the values, etc.

The routing engine may further factor into route selection/time estimation any other routing parameters based upon data known to it. These may comprise traffic, hazards, road construction, etc.

In an embodiment, the at least one cost parameter comprises cost of operating a vehicle. For example, the vehicle routing system may provide an eco-option or economy-option. In this example, a vehicle manufacturer or a user may configure the routing engine with a cost of operating the vehicle dependent upon one or more factors, including: cost of operating the vehicle per distance unit (e.g., mile, kilometer), per unit of time (e.g., minute, hour), and based on vehicle speed. These costs may be based upon cost of fuel, maintenance, etc. In an embodiment, the foregoing cost information is supplied by the vehicle manufacturer. In a further embodiment, a plurality of vehicle costs are preconfigured in the vehicle routing system and a specific vehicle may be selected by a user using the user interface. In these embodiments, the routing engine can determine the candidate routes based upon their respective monetary costs and can select the route to present to the user based on reducing or eliminating such costs.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.0

We claim:

1. A vehicle routing system comprising:
 a) a user interface operable to collect from a user
  i. a start point and end point for which a route is requested; and
  ii. a cost parameter for said user, said cost parameter comprising monetary value of the user's time as a currency amount per a unit of time; and
  iii. a time category for varying the cost parameter of said user according to the user's valuation of their time in different circumstances;
 b) a routing database comprising toll information for routes in a territory; and
 c) a routing engine operable to
  i. determine one or more candidate routes between the start point and the end point by varying the usage of toll routes, each candidate route having a toll cost and a time savings compared to a fastest no-cost route having no tolls;
  ii. compute for each candidate route a monetary cost per the unit of time from its time savings and toll cost; and
  iii. select for output the candidate route having the highest time savings and a monetary cost per the unit of time that is lower than the cost parameter varied by the time category.

2. The system of claim 1, wherein the cost parameter further comprises monetary cost of operating a vehicle.

3. The system of claim 1, wherein the user interface is further operable to collect from the user one or more intermediate points to be traversed along the route.

4. The system of claim 1, wherein the route is the candidate route that has least travel time among the candidate routes having a monetary cost lower than the cost parameter.

5. The system of claim 1, wherein the time categories comprise at least two of business, leisure, family, casual, and urgent.

6. The system of claim 1, wherein said cost parameter can be entered using a user-specified unit and the routing engine normalizes the cost parameter.

7. The system of claim 1, wherein a plurality of such users provide cost parameters and the routing engine determines a blended value of the cost parameters for said users to determine the route.

8. A method for vehicle routing system comprising:
 a) collecting from a user:
  i. a start point and end point for which a route is requested; and
  ii. a cost parameter for said user, said cost parameter comprising monetary value of the user's time as a currency amount per a unit of time; and
  iii. a time category for varying the cost parameter of said user according to the user's valuation of their time in different circumstances;
 b) determining, from a routing database comprising toll information for routes in a territory, one or more candidate routes between the start point and the end point by varying the usage of toll routes, each candidate route having a toll cost and a time savings compared to a fastest no-cost route having no tolls;
 c) computing, by one or more processors, for each candidate route a monetary cost per the unit of time from its time savings and toll cost; and
 d) selecting, by the one or more processors, the the candidate route having the highest time savings and a monetary cost per the unit of time that is lower than the cost parameter varied by the time category.

9. The method of claim 8, wherein the cost parameter further comprises monetary cost of operating a vehicle.

10. The method of claim 8, wherein the user interface is further operable to collect from the user one or more intermediate points to be traversed along the route.

11. The method of claim 8, wherein the route is the candidate route that has least travel time among the candidate routes having a monetary cost lower than the cost parameter.

12. The method of claim 8, wherein the time categories comprise at least two of business, leisure, family, casual, and urgent.

13. The method of claim 8, wherein said cost parameter can be entered using a user-specified unit and the routing engine normalizes the cost parameter.

14. The method of claim 8, wherein a plurality of such users provide cost parameters and the routing engine determines a blended value of the cost parameters for said users to determine the route.

* * * * *